United States Patent [19]
Rice

[11] Patent Number: 5,269,860
[45] Date of Patent: Dec. 14, 1993

[54] METHOD OF ULTRASONICALLY BONDING THERMOPLASTIC TO FIBERS

[75] Inventor: Jeffrey L. Rice, Mercersberg, Pa.

[73] Assignee: Masland Industries, Inc., Carlisle, Pa.

[21] Appl. No.: 786,268

[22] Filed: Nov. 1, 1991

[51] Int. Cl.⁵ ............................................. B32B 31/20
[52] U.S. Cl. .................................. 156/73.1; 156/73.2; 156/580.1
[58] Field of Search ................. 156/73.1, 73.2, 73.4, 156/580.1, 580.2

[56] References Cited
U.S. PATENT DOCUMENTS

| | | | |
|---|---|---|---|
| 3,440,117 | 4/1969 | Soloff et al. | 156/73.1 |
| 4,713,132 | 12/1987 | Abel et al. | 156/73.1 |
| 4,735,753 | 4/1988 | Ackermann | 156/73.1 |
| 4,881,997 | 11/1989 | Hatch | 156/73.1 |

Primary Examiner—Jill L. Heitbrink
Attorney, Agent, or Firm—Rosen, Dainow & Jacobs

[57] ABSTRACT

A material comprising a thermoplastic sheet is bonded ultrasonically to another thermoplastic textile or non-thermoplastic fibrous textile surface. The fibrous textile surface has an equivalent or higher melt temperature than thermoplastic sheet.

23 Claims, 5 Drawing Sheets

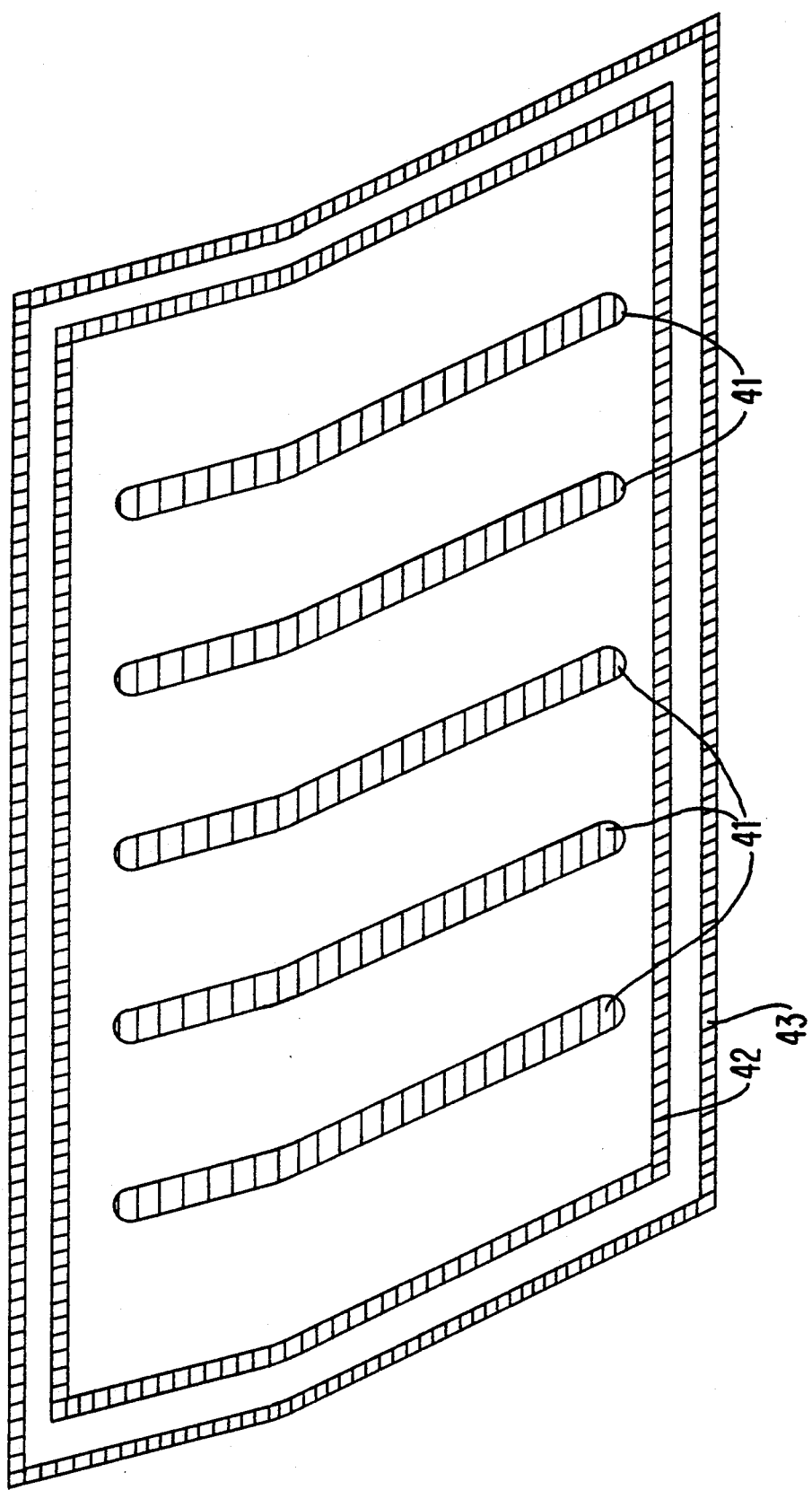

METHOD OF ULTRASONICALLY BONDING THERMOPLASTIC TO FIBERS

TECHNICAL FIELD OF INVENTION

The present invention relates to a method of ultrasonically bonding a thermoplastic sheet to a textile fiber containing article using sonic energy.

THE PRIOR ART

Radio frequency (R.F.) bonding also known as dielectric bonding, uses electrical energy to make bonds or welds between thermoplastic materials. In this type of bonding of materials, electrical energy under pressure causes the molecules to oscillate creating heat and flow between surfaces.

In R.F. welding, small gas ports are drilled in the anvil, also referred to as the nest, or base, to allow warm gases to escape from the cavity to prevent degrading of sheet through trapped hot gases creating excess heat.

Ultrasonic bonding uses mechanical energy to create heat through pressure and friction from the horn vibrating on the thermoplastic surface.

As a general rule, if two thermoplastic materials have a melt temperature (rubber viscous transition state) within 40° of each other, they can be welded together ultrasonically.

As an example of ultrasonic bonding, U.S. Pat. No. 3,440,117 discloses securing elements such as metal pins, wood, in a thermoplastic material with a relatively high melt temperature, the element having a higher softening temperature than the thermoplastic material.

If a textile is made from thermoplastic constituent materials, and if the melt temperature of such textile is higher than the melt temperature of thermoplastic sheet by about 40° F., then the textile surface is considered non-thermoplastic in relationship to these bonds. Some textiles can have a low melt temperature to match the sheet melt temperature. In this case, the thermoplastic sheet will flow faster than the textile fibers will melt giving the same type weld or bond.

SUMMARY OF THE INVENTION

According to the present invention, it has been determined that a material comprising a thermoplastic sheet can be effectively bonded ultrasonically to another thermoplastic textile or non-thermoplastic fibrous textile surface. Said fibrous textile surface must have an equivalent or higher melt temperature than thermoplastic sheet. Apparently, because the textile surfaces described above are higher in melt temperature than the thermoplastic sheet, when ultrasonic energy from a horn is transferred through the textile surface to the thermoplastic sheet, the sheet will begin to soften before the textile surface starts to soften, causing a mechanical bond between the textile fibers and melted sheet.

The present invention can effect a successful bond if one of the materials is in a fibrous form and the other is in a sheet form. Prior art published by Sonics and Materials Inc., the contents of which are hereby incorporated by reference herein discloses a chart listing the characteristics of thermoplastics and a chart listing the compatibility of thermoplastics which indicates that, for example, polypropylene is not compatible with nylon and therefore the two cannot be bonded. Contrary to this, as a result of the method of the present invention, polypropylene can be bonded to nylon if one of these resins is in fiber form subject to the temperature differentials in melt temperatures discussed above. In every instance in the present invention, the sheet is the layer that becomes fusible and bonds to the fibrous materials.

The present invention uses vent holes through the anvil to allow hot gases to escape the cavity that lies beneath the seal bars and is formed by the sides and base of the anvil. This venting appears to prevent degrading of the thermoplastic sheet by virtue of trapped hot gases that create excessive heat.

Using the method of the present invention, as a result of the application of sonic or ultrasonic energy to a textile-sheet composite, fibers embodied in textile surfaces appear to stay intact with melted sheet flowing around them causing a fusion of the materials. This mechanical bond has been found to be equal or greater than that of R.F. bonding using same materials.

BRIEF DESCRIPTION OF THE DRAWINGS

FIG. 4 is a depiction of the final version of the assembly resulting from the process of the present invention.

DETAILED DESCRIPTION OF THE PREFERRED EMBODIMENTS OF THE INVENTION

Figure 1:
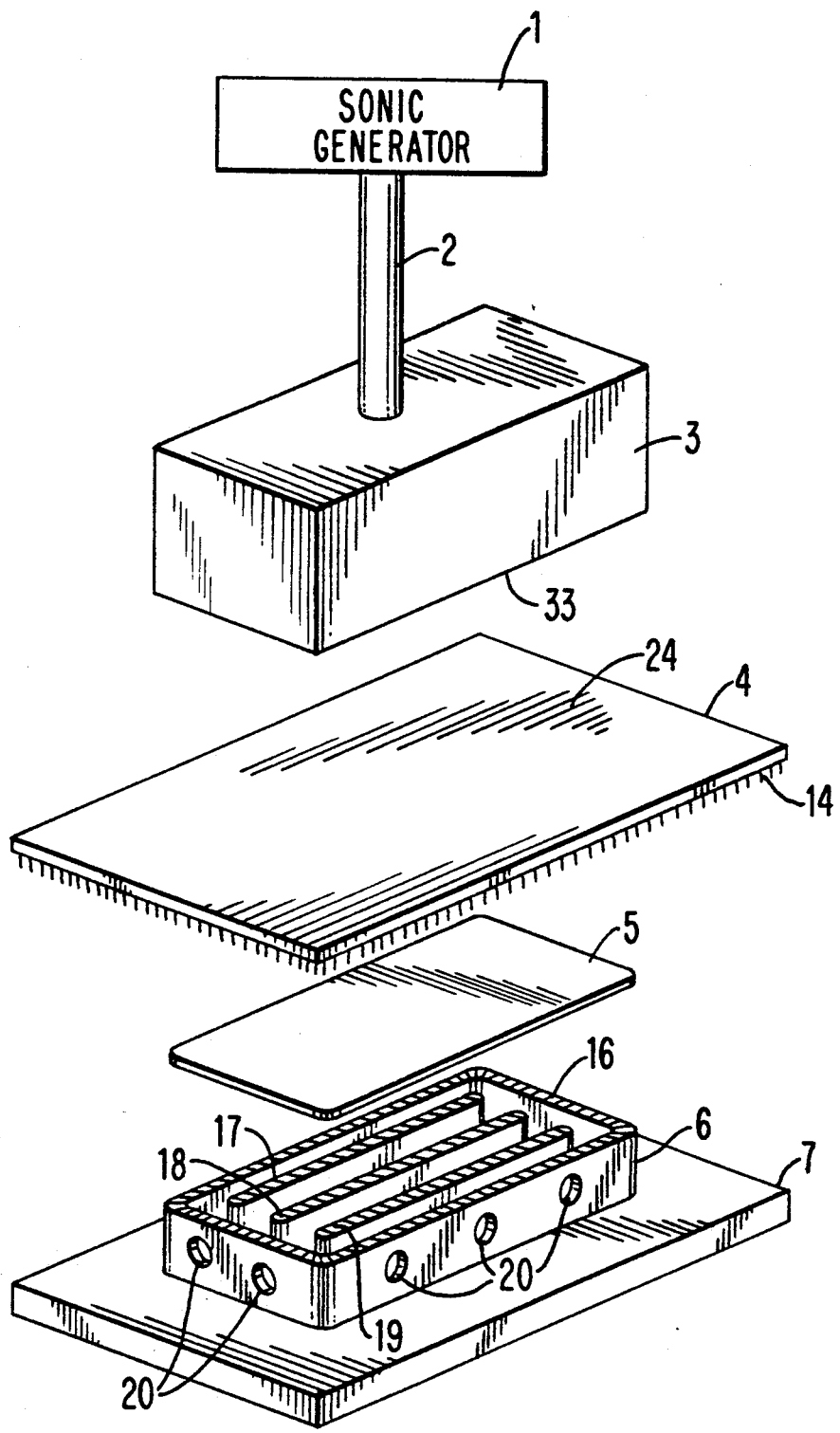
FIG. 1 is a schematic representation of the components used to secure the textile to the sheet.

The basic principle of ultrasonic bonding involves conversion of high frequency electrical energy to high-frequency mechanical energy in the form of reciprocating vertical motion, which, when applied to a thermoplastic, can generate heat at the plastic/plastic or plastic/metal interface. For the purposes of this invention, ultrasonic bonding also includes sonic bonding. Ultrasonic bonding can be achieved in a number of ways. In ultrasonic welding, the frictional heat generated melts the plastic, allowing the two surfaces to fuse together; in ultrasonic staking or forming, the controlled flow of the molten plastic is used to capture or retain another component in place; in ultrasonic insertion, the controlled flow of molten plastic is used to encapsulate a metal insert.

Thermoplastics generally can be ultrasonically assembled because each melts within a specific temperature range, whereas thermosetting materials, which degrade when heated, are generally unsuitable for ultrasonic assembly.

Weldability of any thermoplastic depends upon its stiffness or modulus of elasticity, density, coefficient of friction, thermal conductivity, specific heat and $T_m$ $T_g$.

Rigid plastics exhibit excellent welding properties because they readily transmit vibratory energy. Soft plastics, having a low modulus of elasticity, attenuate the ultrasonic vibrations, and as such are more difficult to weld. In staking, forming or spot welding, the opposite is true. Generally the softer the plastic, the easier it is to stake, form or spot weld.

In considering whether to use amorphous or crystalline resins, ultrasonic energy is easily transmitted through amorphous resins and as such, these resins lend themselves readily to ultrasonic welding. Amorphous resins are characterized by random molecular arrangements, and a broad melting temperature range that allows the material to soften gradually before melting and to flow without prematurely solidifying.

Because the molecular structure in crystalline resins attenuate a great amount of energy, crystalline resins do not readily transmit ultrasonic energy, and they require higher energy levels than amorphous resins. Crystalline resins are characterized by a high sharply defined melting point that causes melting and resolidification to occur rapidly. For these reasons, when welding crystalline resins, higher amplitude and energy levels should be used, and special consideration given to joint design.

The following amorphous thermoplastic materials can be used in the present invention either as the sheet material or as the thermoplastic textile article: acrylonitrile-butadiene-styrene, alone or in combination with polycarbonate or polyvinyl chloride (PVC) rigid or flexible, which polycarbonate or polyvinylchloride also can be used by themselves, acrylic polymers including impact modified acrylic multi polymers-XT polymer, blend of acrylic polymers with PVC, butadiene-styrene copolymers, cellulosics such as cellulose acetate, cellulose acetate butyrate and "CAP," modified polyphenylene oxide, polyarylate, polyetherimide, polystyrene, styrene-acrylonitrile copolymers styrene-maleic anhydride and sulfone polymers.

The following crystalline polymers can be used: acetal homopolymers and copolymers, fluoropolymers, nylon, polycarbonate-polyethylene terephthalate, polybutylene terephthalate, polyetheretherketones, polyethylene, (high density, low density and ultra high molecular weight), polymethylpentene, polyphenylene sulfide and polypropylene.

It must be pointed out that while all of the above polymers are suitable for use as the thermoplastic sheet, in order to be utilized as a textile article, obviously the polymer must be capable of being formed into some type of fiber or fibrous material. Thus in the capacity of a textile article, some of these aforementioned polymers will function better than others or not at all. The selection will be obvious to one skilled in the art. However, as long as the polymer can assume a fibrous form it is capable of being used in accordance with the present invention. This same requirement applies equally to the non-thermoplastic fibrous article. Hence as long as it is in some fibrous form, the thermoplastic sheet can be bonded thereto.

The differential, if any, in the melt temperature of the materials being welded in accordance with the present invention should not exceed about 30° F. to 40° F., and the materials molecular structures should be compatible; i.e.: blends, alloys, copolymers and terpolymers.

Moisture content, mold release agents, lubricants, plasticizers, fillers, reinforcing agents, regrinds, pigments, flame retardants, and resin grade are all variables that can influence weldability.

By selecting the proper thermoplastic materials, some sheets can be welded together using a flat anvil having seal bars therein and a horn with an energy director built into it.

Air pressure, time of hold, and time of weld or power settings are the variables needed to control the weld to satisfactorily secure the materials together. Using a 15 KHz (2500 watts) or 20 KHz (2000 watts) ultrasonic welder and a weld time from about 5 to 20 seconds.

Most welds use 15 KHz for larger areas whereas 20 KHz is used generally for smaller areas. Most of horns used in accordance with the present invention are flat horns without any unique shape to them.

Referring now to the FIGURES and FIG. 1 in particular, sonic generator means 1 is shown which provides via a conductor 2 energy sufficient to power horn 3. Horn 3 transfers the sonic energy generated in means 1 to fibrous material composite 4 wherein backing 24 of the fibrous material composite 4 is facing the bottom surface 33 of horn 3 and fibers or tufts 14 extend downward to be in position during the process to contact the top surface area 5A of thermoplastic sheet 5 situated immediately below tufts 14. The bottom side 5B of thermoplastic sheet 5 rests on an energy director comprising bar seals 16, 17, 18, 19 comprising anvil 6 that is positioned on base 7. Anvil 6 comprises a base and sides integrally connected thereto that form a container-like article that has at the top edge of the sides bar seal 16, and contains within the sides bar seals 17, 18, and 19. Vent holes 20 extend through the sides of anvil 6 to allow gases entrapped in anvil 6 during the process to escape. In use, electrical energy is converted to mechanical vibrations which are amplified and emanate from the bottom surface 33 of horn 3. The horn 3 may assume any suitable configuration as is well known and understood by those skilled in the art. The bottom 33 of horn 3 is shaped to follow the contour of the piece to which it is applied and may be rectangular or round in cross section, solid or tubular depending upon what configuration is required to be impressed on the product.

Figure 2:
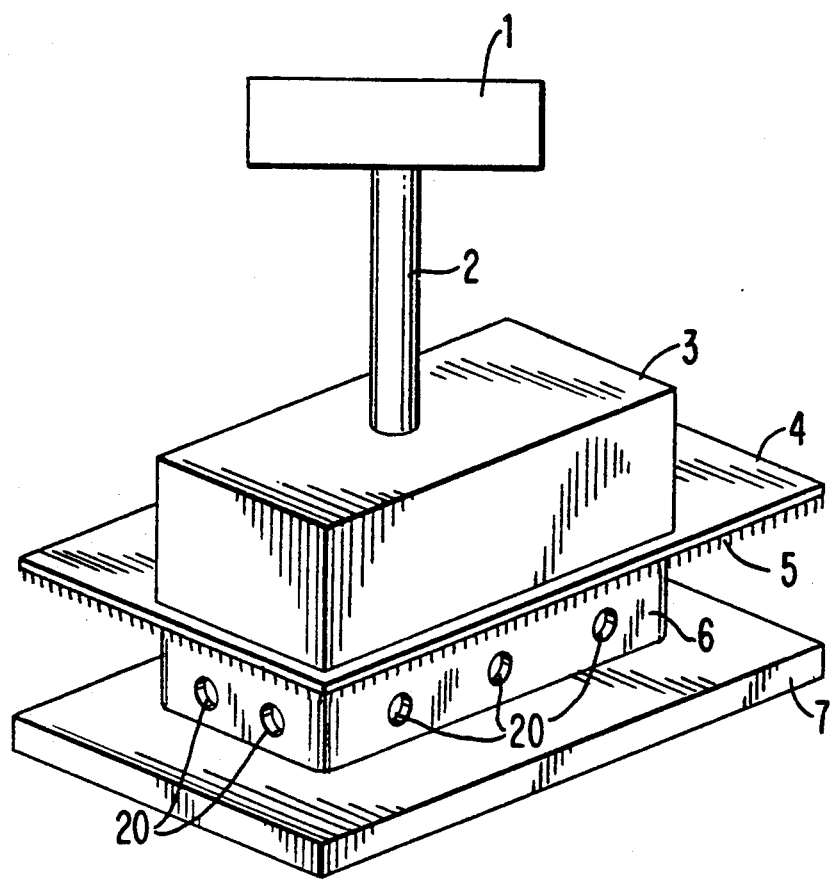
FIG. 2 is a perspective view of the assembly depicted in FIG. 1.

FIG. 2 depicts generator means 1, conductor 2, power horn 3, fibrous material 4 in contact with thermoplastic sheet 5 in place on anvil 6 during the application of energy and engagement between bottom surface 33 of horn 3 and anvil 6. The fibrous textile material 4 has been pressed into engagement with a plastic sheet 5 and the sonic energy applied causes a very localized softening of plastic sheet 5 at the sites where it is in direct contact with the energy director comprising bar seals 16, 17, 18 and 19 of anvil 6 so that the fibrous material and the softened area of the thermoplastic sheet interengage and are fused together at bar seals 16, 17, 18 and 19. The balance of the thermoplastic sheet not in contact with bar seals 16, 17, 18, 19 remains cool and not affected by the energy provided through the horn. When a predetermined fusion of the materials has occurred, the application of sonic energy is terminated and the horn which is applying pressure to the fibrous material is removed from contact therewith and the product is removed ready for use.

Figure 3:
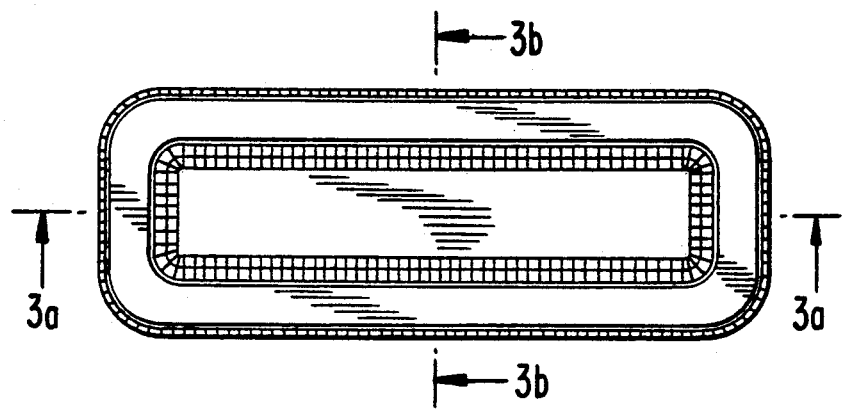
FIG. 3 is a top view of an anvil used in accordance with the present invention.

FIG. 3 is a plan view of an energy director or anvil 60 used in accordance with the present invention having a different arrangement of bar seals 61 and 62 from the arrangement of bar seals depicted in anvil 6 in FIG. 1.

Figure 3A:
FIGS. 3(a), 3(b) 3(c) and FIG. 3(d) are cross sectional views along axes A—A or B—B of FIG. 3.

FIG. 3(a) is a cross sectional view of the top of anvil 60 along line A—A showing the raised areas along the longitudinal axis comprising bar seals 61 and 62.

Figure 3B:

FIG. 3(b) is a cross sectional view of the top of anvil 60 along line B—B showing the raised areas comprising bar seals 61 and 62.

Figure 3C:
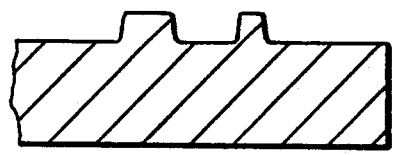

FIG. 3(c) is a magnified view of one of the raised areas 61 and 62 depicted in FIG. 3(b) showing the irregular top surface of the bar seals. The irregularity provides a seal with greater surface than that provided by a smooth surface.

Figure 3D:
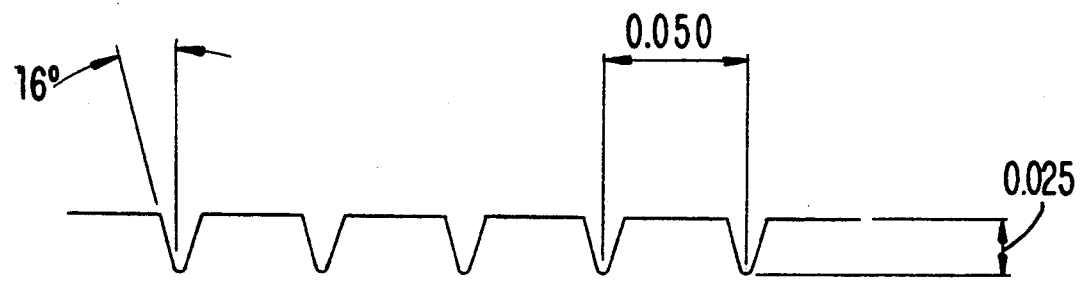

FIG. 3(d) is a further magnified view of one of the raised areas of a seal bar showing the grooves in the bar.

A finished floor mat product having a different configuration is depicted in FIG. 4. After bonding, this product is removed from the apparatus, allowed to cool and the article comprises a thermoplastic sheet that has been fused to the fibrous material and is ready to be used as a floor mat or other product found in the interior of an automobile. The plastic fused areas 26, 27, 28 and 29 correspond to areas occupied by the bar seals on the anvil during processing.

EXAMPLE 1

A sheet of flexible polyvinylchloride (PVC) plastic was bonded to a 16 oz BCF nylon carpet having a backing and tufts extending therefrom suitable for use as a scuff pad in an automobile using a 2000 watt 20 KHz machine in a time mode with 12 seconds weld time, 65 pounds air pressure, and 6 seconds hold time. The horn from the ultrasonic welder was brought into contract with the backing of the carpet with the tuft face of carpet touching one side of the vinyl sheet and with the other side of the vinyl sheet resting on bar seals comprising an anvil. The bar seals focused the weld in specific areas to be bonded. The anvil sides had openings therethrough that allowed gases generated during the process to escape from the interior of the anvil beneath the composite. An excellent bond between the nylon carpet fibers and vinyl sheet was obtained. It was found through alternate experiments that weld works with flat horn and flat anvil.

EXAMPLE 2

The PVC sheet of the type noted in Example 1 was bonded to a non-thermoplastic wool carpet suitable for use as a scuff pad in an automobile using the method described in Example 1. An excellent bond between the wool carpet fibers and vinyl was obtained.

EXAMPLE 3

The PVC sheet of Example 1 was bonded to a polyester nonwoven carpet suitable for use as a scuff pad in an automobile using the process described in Example 1. An excellent bond between the polyester carpet fibers and vinyl was obtained.

EXAMPLE 4

The PVC sheet of Example 1 was bonded to a polypropylene nonwoven carpet suitable for use as a scuff pad in an automobile using the process described in Example 1. An excellent bond between the polypropylene carpet fibers and vinyl was obtained.

EXAMPLE 5

The PVC sheet of Example 1 was bonded to a tufted polypropylene carpet suitable for use as a scuff pad in an automobile using the process described in Example 1. An excellent bond between the polypropylene carpet fibers and vinyl was obtained.

EXAMPLE 6

The PVC sheet of Example 1 was bonded to a cotton "blue jeans" materials using the process described in Example 1. The horn from the ultrasonic welder was placed in contact with the back of the cotton blue jeans material since the material had no backing layer. An excellent bond between the cotton jean fibers and vinyl was obtained.

EXAMPLE 7

The PVC sheet of Example 1 was bonded to a polyester body cloth material without a backing material using the process described in Example 1. An excellent bond between the polyester bodycloth and the vinyl sheet was obtained.

EXAMPLE 8

A Kraton 1101 (styrene-butadiene block copolymer) sheet is bonded to a 16 oz BCF nylon carpet of the type and using the process described in Example 1. An excellent bond between the nylon carpet fibers and Kraton was obtained.

EXAMPLE 9

A Kraton 4000 (styrene-butadiene block copolymer) sheet is bonded to a wool carpet with backing using the process described in Example 1. An excellent bond between the wool carpet fibers and Kraton was obtained.

EXAMPLE 10

A Kraton 1107 (styrene-isoprene copolymer) sheet is bonded to a polyester nonwoven carpet suitable for use as a scuff pad in an automobile using the process described in Example 1. An excellent bond between the wool carpet fibers and Kraton was obtained.

EXAMPLE 11

A Kraton G7720 (a styrene-ethylene-butene-1-styrene triblock copolymer) sheet is bonded to a polypropylene nonwoven carpet suitable for use as a scuff pad in an automobile using the process described in Example 1. An excellent bond between the polypropylene carpet and Kraton was obtained.

EXAMPLE 12

A Kraton G7720 sheet is bonded to a tufted polypropylene carpet suitable for use as a scuff pad in an automobile using the process described in Example 1. An excellent bond between the polypropylene carpet fibers and Kraton was obtained.

EXAMPLE 13

A Kraton 1101 sheet is bonded to a swatch of cotton blue jeans material using the process described in Example 1. An excellent bond between the cotton blue jeans material and Kraton was obtained.

EXAMPLE 14

A Kraton 1101 sheet is bonded to a polyester body cloth the process described in Example 1. An excellent bond between the polyester cloth fibers and Kraton was obtained.

While the invention has been particularly shown and described with respect to preferred embodiments thereof, it will be understood by those skilled in the art that the foregoing and other changes in form and details may be made therein without departing from the spirit and scope of the invention.

What I claim and desire to protect by Letters Patent is:

1. A method of ultrasonically bonding a single thermoplastic sheet material having top and bottom surface area to a thermoplastic textile article or to a non-thermoplastic fibrous article comprising:

placing either a thermoplastic textile article or a non-thermoplastic fibrous article contiguous with the top surface area of said single thermoplastic sheet to form a textile-sheet composite a fiber forming part of said fibrous article, said textile article and said fiber having melt temperatures the same as or greater than said thermoplastic sheet;

the bottom of said thermoplastic sheet being in contact with seal bars embodied within an anvil, said anvil also comprising a base with sides integrally connected thereto, said sides having at least one vent hole therethrough;

contacting said thermoplastic textile article or said non-thermoplastic fibrous article under pressure with ultrasonic energy means and applying sufficient ultrasonic energy to said thermoplastic sheet, through said textile article or said non-thermoplastic fibrous article for sufficient time to soften and melt only said thermoplastic sheet with the fibers embodied in said articles remaining intact, said ultrasonic energy causing a mechanical bond between said textile article or said non-thermoplastic fibrous article and said melted sheet, any gas generated within said anvil during said application of said ultrasonic energy escaping through said vent hole.

2. The method defined in claim 1, wherein the differential melt temperatures of said textile or fibrous article and said thermoplastic sheet being bonded does not exceed 40° F.

3. The method defined in claim 2, wherein said ultrasonic energy is between about 15 KHz and 20 KHz.

4. The method defined in claim 3, wherein said energy is lied for between about 5 and 20 seconds.

5. The method defined in claim 4, wherein said anvil has a plurality of vent holes therethrough.

6. The method defined in claim 2, wherein said energy is sonic energy.

7. The method defined in claim 4, wherein said pressure is between 50 and 75 psi.

8. The method defined in claim 7 wherein said thermoplastic sheet is selected from the group consisting of polyvinylchloride, polystyrene, styrene-butadiene block copolymers, styrene-isoprene copolymers and styrene-ethylene-butene-1-styrene triblock copolymers.

9. The method defined in claim 7, wherein said thermoplastic textile is selected from the group consisting of polypropylene, nylon and polyester.

10. The method defined in claim 7, wherein said non thermoplastic fibrous article is cotton fabric or wool carpet.

11. The method defined in claim 7, where said thermoplastic sheet is selected from the group consisting of polyvinylchloride, polystyrene, styrene-butadiene block copolymers, styrene-isoprene copolymers and styrene-ethylene-butene-1-styrene triblock copolymers, and said thermoplastic textile is selected from the group consisting of polypropylene, nylon and polyester.

12. The method defined in claim 7, wherein said thermoplastic sheet is selected from the group consisting of polyvinylchloride, polystyrene, styrene-butadiene block copolymers, styrene-isoprene copolymers and styrene-ethylene-butene-1-styrene triblock copolymers, said non-thermoplastic fibrous article is cotton fabric or wool carpet.

13. The method defined in claim 11, wherein said thermoplastic sheet is polyvinylchloride and said textile article is nylon.

14. The method defined in claim 11, wherein said thermoplastic sheet is polyvinylchloride and said textile article is polyester.

15. The method defined in claim 11, wherein said thermoplastic sheet is polystyrene and said textile article is nylon.

16. The method defined in claim 11, wherein said thermoplastic sheet is styrene-ethylene-butene-1-styrene triblock copolymer and said textile article is nylon carpet.

17. The method defined in claim 11, wherein said thermoplastic sheet is styrene-ethylene-butene-1-styrene triblock copolymer and said textile article is polypropylene nonwoven carpet.

18. The method defined in claim 11, wherein said thermoplastic sheet is styrene-ethylene-butene-1-styrene triblock copolymer and said textile article is polypropylene tufted carpet.

19. The method defined in claim 12, wherein said thermoplastic sheet is polyvinylchloride and said non thermoplastic fibrous article is cotton fabric.

20. The method defined in claim 12, wherein said thermoplastic sheet is styrene-ethylene-butene-1-styrene triblock copolymer and said non-thermoplastic fibrous article is wool carpet.

21. The method defined in claim 12, wherein said thermoplastic sheet is styrene-ethylene-butene-1-styrene and said non-thermoplastic fibrous article is cotton fabric.

22. The method defined in claim 12, wherein said thermoplastic sheet is polyvinylchloride and said non-thermoplastic fibrous article is wool carpet.

23. The method defined in claim 12, wherein said thermoplastic sheet is polystyrene and said non-thermoplastic fibrous article is cotton fabric.

* * * * *